United States Patent [19]
Rapson

[11] 3,789,108
[45] Jan. 29, 1974

[54] PRODUCTION OF CHLORINE DIOXIDE

[75] Inventor: William Howard Rapson, Scarborough, Ontario, Canada

[73] Assignee: ERCO Industries Limited, Islington, Ontario, Canada

[22] Filed: Feb. 8, 1973

[21] Appl. No.: 330,602

Related U.S. Application Data
[62] Division of Ser. No. 147,821, May 28, 1971.

[52] U.S. Cl.............. 423/478, 423/477, 423/520, 423/351, 423/552, 252/187 R
[51] Int. Cl...... C01b 11/02, C01d 5/02, C01h 7/02
[58] Field of Search... 423/478, 511, 520, 551, 552; 252/187 R

[56] References Cited
UNITED STATES PATENTS
| | | | |
|---|---|---|---|
| 3,341,288 | 9/1967 | Partridge et al. | 423/478 |
| 3,347,628 | 10/1967 | Sepall et al. | 252/187 R X |
| 3,563,702 | 2/1971 | Partridge et al. | 423/478 |

FOREIGN PATENTS OR APPLICATIONS
| | | | |
|---|---|---|---|
| 543,589 | 7/1957 | Canada | 423/478 |
| 1,056,790 | 1/1967 | Great Britain | 423/478 |
| 1,077,306 | 7/1967 | Great Britain | 423/478 |

*Primary Examiner*—Edward Stern

[57] ABSTRACT

Chlorine dioxide is produced from three reactors, the first reacting sodium chlorate, sodium chloride and/or hydrogen chloride, and sulphuric acid at an acidity in excess of 4.8N to deposit sodium acid sulphate, the second reacting sodium chlorate, sodium chloride and/or hydrogen chloride, and a sulphate-ion material which is constituted at least in part by the sodium acid sulphate deposited in the first reaction, at an acidity greater than 4.8N to deposit sodium sesquisulphate. In the third vessel sodium chlorate, sodium chloride and/or hydrogen chloride and a sulphate-ion material which is constituted at least in part by the sodium sesquisulphate at an acidity less than 4.8N to deposit sodium sulphate.

4 Claims, 1 Drawing Figure

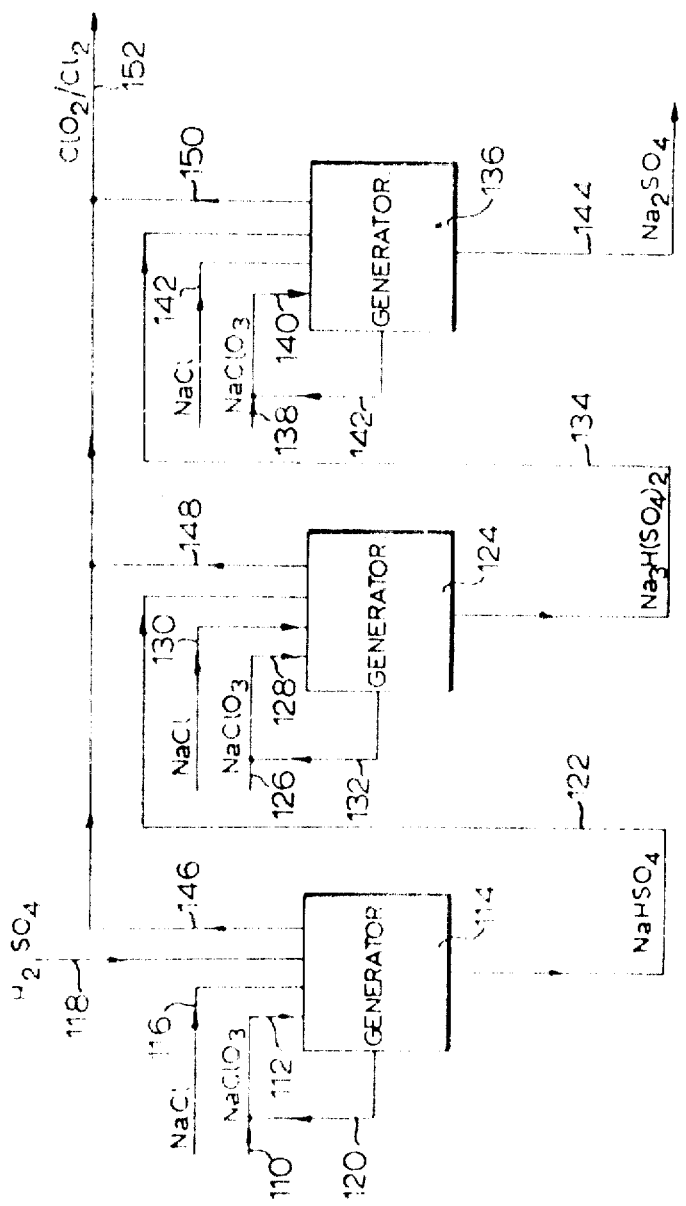

PRODUCTION OF CHLORINE DIOXIDE

This application is a division of U.S. Application Ser. No. 147,821 filed May 28, 1971.

This invention relates to the production of chlorine dioxide.

Chlorine dioxide is used in the bleaching or cellulosic materials, such as wood pulp produced by the Kraft or sulfite processes.

One of the known methods of production of chlorine dioxide involves reaction of an alkali metal chlorate, an alkali metal chloride and sulphuric acid. The reactions involved are as follows:

1. $MClO_3 + MCl + H_2SO_4 \rightarrow ClO_2 + \frac{1}{2}Cl_2 + M_2SO_4 + H_2O$ 2. $MClO_3 + 5MCl + 3H_2SO_4 \rightarrow 3Cl_2 + 3M_2SO_4 + 3H_2O$ where M is an alkali metal. Reaction 2 becomes significant when the mole ratio of chloride to chlorate substantially exceeds 1:1. Since no chlorine dioxide is produced by the process of equation 2, to maximize production of chlorine dioxide from chlorate, it is preferred to operate at an approximately equimolar or only slightly higher ratio of chloride to chlorate in the feed.

A method of operating the above system to produce chlorine dioxide and chlorine for use in bleaching, for example, wood pulp, and used commercially is known as the "Rapson R2" process, also known as the "Hooker R2" and "ER2" processes, as disclosed in Canadian Pat. No. 543,589, issued Jul. 16, 1957 to Electric Reduction Co. of Canada, Limited. The Rapson R2 process involves introduction into a generator of a stream of an aqueous solution of an approximately equimolar or slightly higher proportion of sodium chloride and sodium chlorate and a stream of concentrate sulphuric acid. Air is introduced at the bottom of the generator to carry chlorine dioxide and chlorine produced in the generator out of the generator and to further processing to separate the chlorine dioxide and chlorine. The aqueous effluent from the generator contains sodium bisulphate ($NaHSO_4$) and unreacted sodium chlorate, sodium chloride and sulphuric acid. The sodium bisulphate may be crystallized out and the mother liquor returned to the generator. The sodium bisulphate may be mixed with sodium sesquisulphate ($Na_3H(SO_4)_2$), depending on the conditions of operation of the generator.

The R2 process generally is carried out under conditions of high acidity, such as about 10N. In accordance with an invention described in Canadian Pat. No. 826,577 issued Nov. 4, 1969, to Electric Reduction Company of Canada, Limited, chlorine dioxide and chlorine can be obtained by reacting sodium chlorate, sodium chloride and sulphuric acid under conditions of low acidity, generally of the order of 2 to 4.8 N.

The effluent from the generator used in this low acidity operation contains sodium sulphate ($Na_2SO_4$) in addition to unreacted sodium chlorate, sodium chloride and sulphuric acid. The sodium sulphate may be recovered by either evaporating the solution, in which case the sodium sulphate is recovered as anhydrous sodium sulphate, or by cooling the solution, in which case the sodium sulphate is recovered as sodium sulphate decahydrate ($Na_2SO_4 \cdot 10H_2O$). The mother liquor then may be recycled to the generator.

In Canadian Pat. No. 825,084 issued Oct. 14, 1969 to Electric Reduction Co. of Canada, Limited, there is described a process of forming chlorine dioxide and chlorine from sodium chlorate, sodium chloride and sulphuric acid in which the chlorine dioxide and chlorine are generated and a sodium acid sulphate crystallized in the same vessel. This may be achieved by operating the generator at the boiling point of the reactants under reduced pressure. The water evaporated thereby serves to remove the chlorine dioxide and chlorine generated from the vessel, thereby eliminating the necessity of a separate air stream to remove the gaseous products from the vessel. In addition, the quantity of water is reduced in the vessel as the evaporation takes place, thereby inducing precipitation of the sodium acid sulphate within the vessel.

The sodium acid sulphate is recovered from the vessel and the spent reaction liquor containing unreacted sodium chlorate, sodium chloride and sulphuric acid may be returned to the generator.

The form of the sodium acid sulphate produced is dependent on the acidity and the temperature of the reacting liquor. The acid sulphate may be in the form of sodium bisulphate, i.e., $NaHSO_4$ or sodium sesquisulphate $Na_3H(SO_4)_2$. Sodium sesquisulphate may be produced over an acidity range of 4.8 to 9N. For example, while sodium bisulphate may be produced at an acidity of 10N at about 75°C in boiling solution, sodium sesquisulphate may be produced at 8N acidity at about 30°C in boiling solution.

The process disclosed in the aforementioned Canadian Pat. No. 826,577 and described above preferably is performed in a single vessel, wherein chlorine dioxide and chlorine are generated, water is evaporated and sodium sulphate is precipitated. Under the conditions of low acidity, i.e., about 2 to about 4.8N, the sodium sulphate deposited is generally anhydrous sodium sulphate ($Na_2SO_4$), possibly mixed with some sodium sesquisulphate at the high end of the acidity range.

In accordance with the present invention, three single vessel generator-evaporator-crystallizers are operated in sequence, two operating at decreasing high acidity and one at low acidity.

Single vessel generator-evaporator-crystallizers suitable for use in the process of the present invention are described in the abovementioned Canadian Pat. No. 825,084.

A three-stage chlorine dioxide production operation in accordance with this invention comprises a first stage wherein sodium chlorate, a chloride which is sodium chloride, hydrochloric acid or mixtures thereof and sulphuric acid is reacted in aqueous medium in a single vessel generator-evaporator-crystallizer at an acidity in the region of 9 to 12N. Sufficient water is evaporated from the aqueous medium to induce crystallization of sodium bisulphate.

The evaporated water acts as a diluent for the chlorine dioxide and chlorine generated in the reaction, and the product gases are removed from the vessel as a gaseous mixture including the steam.

The sodium chlorate and sodium chloride may be introduced into the vessel as aqueous solutions or if desired, in dry form. Any desired molar ratio of sodium chloride: sodium chlorate can be employed, but it is preferred to utilize an approximately equimolar ratio in order to maximize the production of chlorine dioxide in accordance with equation 1 above. Ratios of chloride: chlorate generally vary between 1:1 and 3:1, preferably about 1.1:1 to 1.3:1.

An aqueous solution containing both sodium chlorate and sodium chloride may be fed as one stream to the vessel and the sulphuric acid as a separate stream. Alternatively, aqueous solutions of sodium chlorate and sodium chloride may be fed as separate streams to the vessel.

The sulphuric acid generally is added to the vessel in concentrated form in order to produce the required acidity in the reaction medium.

Concentrations of chlorate and chloride in the reaction medium may vary over a wide range. For example, the concentration of the chlorate in the reacting solution may be in the range of about 0.005 to about 3 molar and the concentration of the chloride may be in the range of about 0.001 to about 2 molar.

The temperature of the reaction medium may vary over a wide range, but is generally between about 30° and 80°C. It is preferred to operate the vessel at substantially the boiling point of the reaction medium, whereby maximum rate of evaporation of water vapour is achieved. To maintain the reaction medium at its boiling point, the vessel preferably is subjected to an at least partial vacuum.

Chlorine dioxide gas at normal atmospheric pressure spontaneously decomposes with detonation. The water vapour dilutes the chlorine dioxide rendering it less susceptible to spontaneous decomposition. The chlorine dioxide and chlorine produced are removed from the generator as a mixture with the evaporated water.

The sodium bisulphate crystallized in the vessel is separated from the liquor and transferred in accordance with this invention to a second single vessel generator-evaporator-crystallizer containing an aqueous reaction medium comprising sodium chlorate and a chloride which is sodium chloride, hydrochloric acid or a mixture thereof.

The sodium bisulphate supplies at least a substantial proportion, preferably all, of the acid requirement of the second vessel due to its acidic nature. The second vessel operates at a lower acidity, generally from about 5 to 9N. Any additional acid requirement may be provided by sulphuric acid. Sufficient water vapour is evaporated from the reaction medium to crystallize sodium sesquisulphate ($Na_3H(SO_4)_2$) in the vessel.

The separated sodium sesquisulphate crystallized in the vessel is separated from the liquor and is transferred to a third single vessel generator-evaporator-crystallizer containing an aqueous reaction medium comprising sodium chlorate and a chloride which is sodium chloride, hydrochloric acid or a mixture thereof. Te sodium sesquisulphate supplies at least a substantial proportion, preferrably all of the acid requirement of the third vessel due to its acidic nature. The third vessel, therefore, operates at a low acidity, generally from about 2 to 4.8N. Any additional acid requirement may be provided by sulphuric acid. Sufficient water vapour is evaporated from the reaction medium to crystallize anhydrous sodium sulphate ($Na_2SO_4$) in the vessel.

Where all of the sodium bisulphate formed in the first stage is used as the sole acid source of the second stage and all of the sodium sesquisulphate formed in the second stage is used as the sole acid source of the third stage, the reactions involved are represented by the following equations:

$2NaClO_3 + 2NaCl + 4H_2SO_4 \rightarrow 2ClO_2 + Cl_2 + H_2O + 4NaHSO_4$ $NaClO_3 + NaCl + 4NaHSO_4 \rightarrow ClO_2 + \frac{1}{2}Cl_2 + 2Na_3H(SO_4)_2 + H_2O$ $NaClO_3 + NaCl + 2Na_3H(SO_4)_2 \rightarrow ClO_2 + \frac{1}{2}Cl_2 + 4Na_2SO_4 + H_2O$ Therefore, half of the total chlorine dioxide produced by the overall process is formed at high acidity utilizing sulphuric acid, one-quarter of the total chlorine dioxide is formed at high acidity using sodium bisulphate as the acid and one-quarter of the total chlorine dioxide is formed at low acidity using sodium sesquisulphate as the acid.

The high acidity reactions are about 99 percent efficient but involve acid losses whereas the low acidity reaction is about 94 percent efficient and involves no acid losses. The overall process, therefore, is about 97.8 percent efficient for conversion of sodium chlorate to chlorine dioxide and involves no acid losses.

The evaporated water acts as a diluent for the chlorine dioxide and chlorine generated and the product gases are removed from the second and third vessels by the steam.

As in the case of the first vessel, the sodium chlorate and sodium chloride may be fed to the second and third vessels as a single stream of aqueous solution, or as separate streams of aqueous solutions of the sodium chlorate and sodium chloride. Concentrations of the sodium chlorate and sodium chloride, temperature of reaction and other parameters are similar to those described above for the first vessel.

In particular, it is preferred that the mole ratio of chloride:chlorate be approximately 1:1, the reaction be carried out substantially at the boiling point of the reaction medium and that the second and third vessels be maintained under a reduced pressure.

It is preferred that the process of the present invention be carried out continuously, so that sodium bisulphate recovered from the first vessel is transferred continuously to the second vessel, the sodium sesquisulphate recovered from the second vessel is transferred continuously to the third vessel, and anhydrous sodium sulphate is recovered continuously from the third vessel.

In the preferred embodiment wherein the process is operated continuously, the level of the reaction medium in each vessel is maintained substantially constant. Any overflow liquid from the first vessel is recycled to the reactant feed input of the first vessel, any overflow liquid from the second vessel is recycled to the reactant feed input of the second vessel, and any overflow liquid from the third vessel is recycled to the reactant feed input of the third vessel.

It is possible to combine this system with other chlorine dioxide generators. For example, a further generator in which chlorate, chloride and sulphuric acid are reacted at high acidity, for example, 10N may be provided.

This latter generator may be operated so that no acid sulphate is deposited in the vessel. The whole of liquid effluent from the generator may be passed to the high acidity generator precipitating sodium bisulphate. The effluent from one high acidity generator thereby forms part of the chlorate, chloride and acid requirement of another high acidity generator.

A number of chlorine dioxide generators may be operated in a series operation in this way with passage of liquid effluent from one generator to the next. It is essential, of course, that the last two high acidity generators in the series, prior to the low acidity generator, be operated to precipitate acid sulphate for use as at least part of the acid requirement in successive generators.

These additional generators may be of the type described above wherein steam is used to remove chlorine dioxide and chlorine from the generators, or of the R2-type mentioned above, using air as the diluting gas.

Further, an additional single vessel-type high acidity chlorine dioxide generator may be provided in parallel operation with the existing high acidity generators. Such additional generator may be operated to precipitate acid sulphate. The acid sulphate from this additiional high acidity generator may be forwarded to the low acidity chlorine dioxide generator as part of the acid requirement thereof.

In addition, where such generators are provided in parallel, one or more further high acidity generators of the steam dilution-type or R2-type may be provided. These latter generators may be operated so that acid sulphate is not precipitated therein, and the liquid effluent therefrom may be passed, partly to one and partly to the other of the parallel, acid sulphate-precipitating generators. Other combinations are possible as will be evident to the skilled practitioner.

Such combinations may be desirable where large quantities of chlorine dioxide is required and only limited capacity generators are available.

The anhydrous sodium sulphate recovered from the low acidity reaction may be used as a source of sodium and sulphur make-up in a Kraft recovery system. In the Kraft process for the production of cellulosic fibrous pulp, the fibrous cellulosic material, generally wood chips, is digested by heating with a "white liquor" containing sodium sulphide and sodium hydroxide to dissolve from the wood chips a substantial part of the hemicelluloses and the liquor and other extractable organic materials contained therein. The fibrous pulp so produced is separated from the resulting "black liquor" and washed and passed to bleaching operations.

The black liquor is subjected to a series of operations in a recovery system. The black liquor first is concentrated by evaporation of water and the concentrated black liquor is burnt in a furnace to yield a smelt containing sodium carbonate and sodium sulphide. The smelt is dissolved in water to yield a raw "green liquor" which then is clarified. The clarified green liquor is causticized with lime, whereby the sodium carbonate is converted into sodium hydroxide and calcium carbonate is precipitated as a mud. The mud is calcined after washing to regenerate lime for further causticization. The causticized green liquor then is recycled as white liquor.

To make up sodium and sulphur values lost from the system, sodium sulphate is added, generally to the black liquor before it is fed to the furnace. The sodium sulphate is converted in the furnace to form sodium sulphide and sodium carbonate, the sodium carbonate being converted to sodium hydroxide on causticization. Thus, the sodium sulphide and sodium hydroxide content of the white liquor is maintained at the desired level.

Alternatively, part or all of the anhydrous sodium sulphate recovered could be converted into sulphuric acid by dissolving the sodium sulphate in a small amount of water and treating the solution with dry hydrogen chloride, in accordance with the invention described and claimed in copending Canadian Application Ser. No. 072,527 filed Jan. 20, 1970.

The invention is further described with reference to the accompanying drawing which is a flow sheet of one embodiment of the invention.

Referring to the drawing, sodium chlorate solution is fed through lines 110 and 112 to a first generator 114, containing a boiling aqueous reaction medium of sodium chlorate, sodium choride and sulphuric acid having a high acidity, typically around 10 N. Aqueous sodium chloride solution is fed to the first generator 114 through line 116 and concentrated sulphuric acid is fed through line 118. The generator 114 is maintained under a reduced pressure in any convenient manner. Any overflow liquor from the reaction medium is recycled by line 120 to line 112.

While the sodium chlorate and sodium chloride are indicated to be fed in separate streams to the generator 114, in practice, there may be only a single stream containing these two reactants.

The rate of feed of the feed streams, the rate of removal of liquor as overflow and the rate of removal of water by evaporation are adjusted so that the level of the reaction liquor in the generator 114 is maintained substantially constant.

Water is evaporated from the reaction medium and sodium bisulphate crystallizes out of the reaction medium. The crystallized sodium bisulphate is fed by line 122 to a second chlorine dioxide generator 124.

The generator 124 contains a boiling aqueous reaction medium of sodium chlorate, sodium chloride and acid values. Feeds of aqueous sodium chlorate and sodium chloride to the generator 124 may be made by lines 126, 128 and 130. These feed streams may be combined into a single stream if desired.

The generator 124 is maintained under a reduced pressure. Any overflow liquor from the reaction medium in the generator 124 is recycled by line 132 to the line 128.

The sodium bisulphate in line 122 constitutes the sole source of acid in the generator 124. By appropriate adjustment of concentration, the reaction medium in the generator 124 has an acidity of about 7 to 8N. It may be desired to supplement the acid feed from the bisulphate with sulphuric acid.

The rate of feed of the streams, the rate of removal of liquor as overflow and the rate of removal of water by evaporation are adjusted so that the level of the reaction liquor in the generator 124 is maintained substantially constant.

Water is evaporated from the reaction medium and sodium sesquisulphate crystallizes out of the reaction medium in generator 124 and is fed by line 134 to a third chlorine dioxide generator 136.

The generator 136 contains a boiling aqueous reaction medium of sodium chlorate, sodium chloride and acid values. Feeds of aqueous sodium chlorate and sodium chloride to the generator 136 may be made by lines 138, 140 and 142. A single feed stream containing sodium chloride and sodium chlorate may be used, if desired.

The generator 136 is maintained under a reduced pressure. Any overflow liquor from the reaction medium in the generator 136 is recycled by line 142 to the line 140.

The sodium sesquisulphate in line 134 constitutes the sole source of acid in the generator 136 and imparts to the reaction medium an acidity of between 2 to 4.8 N. It may be desired to supplement the acid feed from the sesqusulphate with sulphuric acid.

The rate of feed of the streams, the rate of removal of liquor as overflow and the rate of removal of water by evaporation are adjusted so that the level of the reaction liquor in the generator 136 is maintained substantially constant.

Water is evaporated from the reaction medium in the generator 136 and anhydrous sodium sulphate crystallizes out of the reaction medium. The anhydrous sodium sulphate is removed from the generator 136 by line 144, for use in a Kraft mill or for further processing.

The gaseous products of the generators 114, 124 and 136 are removed respectively by lines 146, 148 and 150 and form a common stream 152 which may be passed to a chlorine dioxide absorber for separation of the chlorine dioxide and chlorine, as described above with reference to the embodiment of FIG. 1.

The generators 114, 124 and 136 may be of any convenient type, typically one described in the above-mentioned Canadian Pat. 825,084.

The sodium chlorate fed to the generators 114, 124 and 136 may be provided in any convenient manner, for example, from a chlorate cell wherein an acid solution of sodium chloride is electrolyzed. The sodium chlorate may be dry fed, if desired.

The sodium chloride fed to the generators 114, 124 and 136 may be replaced at least in part by hydrochloric acid.

The generators 114, 124 and 136 as mentioned are maintained at the boiling point of the reaction medium at a reduced pressure, typically at a temperature of about 75°C.

The present invention provides a considerable advantage over the production of chlorine dioxide separately at high and low acidities.

Thus, the present invention has the advantage over the process carried out at high acidity in a single vessel generator-evaporator-crystallizer, in that the acid values present in the sodium acid sulphate crystallized from the generator are utilized and not lost from the system. The present invention has advantage over the process carried out at low acidity in a single vessel generator-evaporator-crystallizer, in that at least part of the sulphuric acid requirement can be supplied by a by-product acid material, which would otherwise not have its acid values recovered.

The only solid product of the process of the present invention is anhydrous sodium sulphate which is readily utilizable in the Kraft mill recovery process described above, or in the production of sulphuric acid, in accordance with the process of copending Canadian Application Ser. No. 072,527.

Further, a large quantity of water is required to be evaporated in the low acidity generator. By operating in accordance with the present invention, this quantity is reduced for the same overall quantity of chlorine dioxide and anhydrous sodium sulphate produced, so that the heat requirement of the system is reduced. In addition, the efficiency of conversion of sodium chlorate to chlorine dioxide by the low acidity process is increased by use of the process of the present invention, by contrast with operation of a single vessel generator-evaporator-crystallizer at low or high acidity.

Modifications are possible within the scope of this invention.

What I claim is:

1. A process for the production of chlorine dioxide which comprises generating chlorine dioxide and chlorine from a first aqueous reaction medium having an acidity from 9N to 12N in a first reaction zone, said first aqueous reaction medium comprising sodium chlorate, a chloride selected from sodium chloride, hydrogen chloride and mixtures thereof, and sulphuric acid, evaporating sufficient water from said first reaction medium and subjecting said reaction medium to an elevated temperature to precipitate sodium bisulphate in said first zone, recovering said sodium bisulphate from said first zone, forming a second aqueous reaction medium having an acidity from 5 to 9N in a second reaction zone by feeding to an aqueous solution containing sodium chlorate and a chloride selected from sodium chloride, hydrogen chloride and mixtures thereof, a sulphate ion-containing acidic material comprising at least part of said sodium bisulphate recovered from said first zone, said at least part of said sodium bisulphate constituting at least a major proportion of said sulphate ion-containing acidic material, generating chlorine dioxide and chlorine from said second reaction medium in said second reaction zone, evaporating sufficient water from said second reaction medium and subjecting said reaction medium to an elevated temperature to precipitate sodium sesquisulphate in said second zone, recovering said sodium sesquisulphate from said second zone, forming a third aqueous reaction medium having an acidity from 2 to 4.8N in a third reaction zone by feeding to an aqueous solution containing sodium chlorate and a chloride selected from sodium chloride, hydrogen chloride and mixtures thereof, a sulphate ion-containing acidic material comprising at least part of said sodium sesquisulphate recovered from said second reaction zone, said at least part of said sodium sesquisulphate constituing at least a major proportion of said latter sulphate ion containing acidic material, generating chlorine dioxide and chlorine from said third reaction medium in said third reaction zone, evaporating sufficient water from said third reaction medium to precipitate anhydrous sodium sulphate in said third reaction zone, and recovering chlorine dioxide and chlorine generated in said first, second and third reaction zones.

2. The process of claim 1 wherein said first, second and third reaction media are maintained at a boiling temperature and said first, second and third reaction zones are maintained under reduced pressure.

3. The process of claim 2 wherein the sodium bisulphate precipitated in said first reaction zone constitutes the sole source of acidity of said second reaction medium and the sodium sesquisulphate precipitated in said second reaction zone constitutes the sole source of acidity of said third reaction medium.

4. The process of claim 1 wherein the acidity of said first reaction medium is appoximately 10N and the acidity of said second reaction medium is approximately 7 to 8N.

* * * * *